(12) United States Patent
Vig et al.

(10) Patent No.: US 11,231,862 B1
(45) Date of Patent: Jan. 25, 2022

(54) LOCALIZED LOOKUPS FOR EFFICIENT DATABASE SERVICE REQUEST PROCESSING

(71) Applicant: Amazon Technologies, Inc., Seattle, WA (US)

(72) Inventors: Akshat Vig, Seattle, WA (US); Somasundaram Perianayagam, Seattle, WA (US); Rashmi Krishnaiah Setty, Santa Clara, CA (US); Stefano Stefani, Issaquah, WA (US); James Christopher Sorenson, III, Seattle, WA (US); Craig Wesley Howard, Seattle, WA (US); Akhilesh Mritunjai, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/917,753

(22) Filed: Jun. 30, 2020

(51) Int. Cl.
*G06F 3/06* (2006.01)
*H04L 9/32* (2006.01)
*G06F 21/62* (2013.01)

(52) U.S. Cl.
CPC .......... *G06F 3/0635* (2013.01); *G06F 3/0604* (2013.01); *G06F 3/067* (2013.01); *G06F 3/0617* (2013.01); *G06F 3/0622* (2013.01); *G06F 3/0653* (2013.01); *G06F 3/0659* (2013.01); *G06F 3/0665* (2013.01); *G06F 3/0683* (2013.01); *G06F 21/6218* (2013.01); *H04L 9/3213* (2013.01)

(58) Field of Classification Search
None
See application file for complete search history.

(56) References Cited

U.S. PATENT DOCUMENTS

| | | | |
|---|---|---|---|
| 7,685,131 B2 | 3/2010 | Batra et al. | |
| 2004/0098390 A1* | 5/2004 | Bayliss | G06F 16/27 |
| 2009/0240664 A1* | 9/2009 | Dinker | G06F 16/27 |
| 2015/0303949 A1* | 10/2015 | Jafarkhani | H03M 13/617 |
| | | | 714/764 |
| 2017/0060605 A1 | 3/2017 | Huang et al. | |
| 2019/0361848 A1* | 11/2019 | Weaver | G06F 16/27 |
| 2020/0127971 A1 | 4/2020 | Saxena | |

* cited by examiner

*Primary Examiner* — Brian R Peugh
(74) *Attorney, Agent, or Firm* — Robert C. Kowert; Kowert, Hood, Munyon, Rankin & Goetzel, P.C.

(57) ABSTRACT

Localized lookups for performing access requests to a database may be implemented. Mapping information for storage nodes of a network-based service storing different data for different databases may be obtained by a routing application co-hosted with a client application of the database at a same container host. Access requests from the client application are handled by the routing application and sent to storage nodes identified using the mapping information. An authorization token may be included along with the requests to verify authorization to perform the access request at the storage nodes.

20 Claims, 9 Drawing Sheets

LOCALIZED LOOKUPS FOR EFFICIENT DATABASE SERVICE REQUEST PROCESSING

BACKGROUND

Database services manage large amounts of data on behalf of client applications. To support various client application features, different types of requests, including requests to create, update, read, or delete data may be supported. Therefore, the performance characteristics of these requests can impact the performance of the reliant client application features.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The techniques described herein may implement localized lookups for efficient database service request processing. Architectures of network-based services may impact the performance of both the network-based services and clients of the network-based services. For example, the number of network hops (e.g., transmitting a message between different network locations) for performing a request a network-based service may be a significant factor in request performance overall, as more network hops may result in longer performance times (e.g., due to increased network latency and/or risk of dropped messages). For network-based services that store, utilize, or otherwise implement a database, the volume of requests to access the database may be even more sensitive to the architecture of the network-based service, as the performance penalty incurred by features like additional network hops, may quickly compound over a large volume of requests. In various embodiments, techniques for localized lookups for efficient database service request processing may provide techniques that can reduce, minimize, and/or eliminate architectural features that would otherwise reduce the performance of access requests to a database. In this way, the overall performance of a network-based service implementing a database and client applications can be improved.

Figure 1:
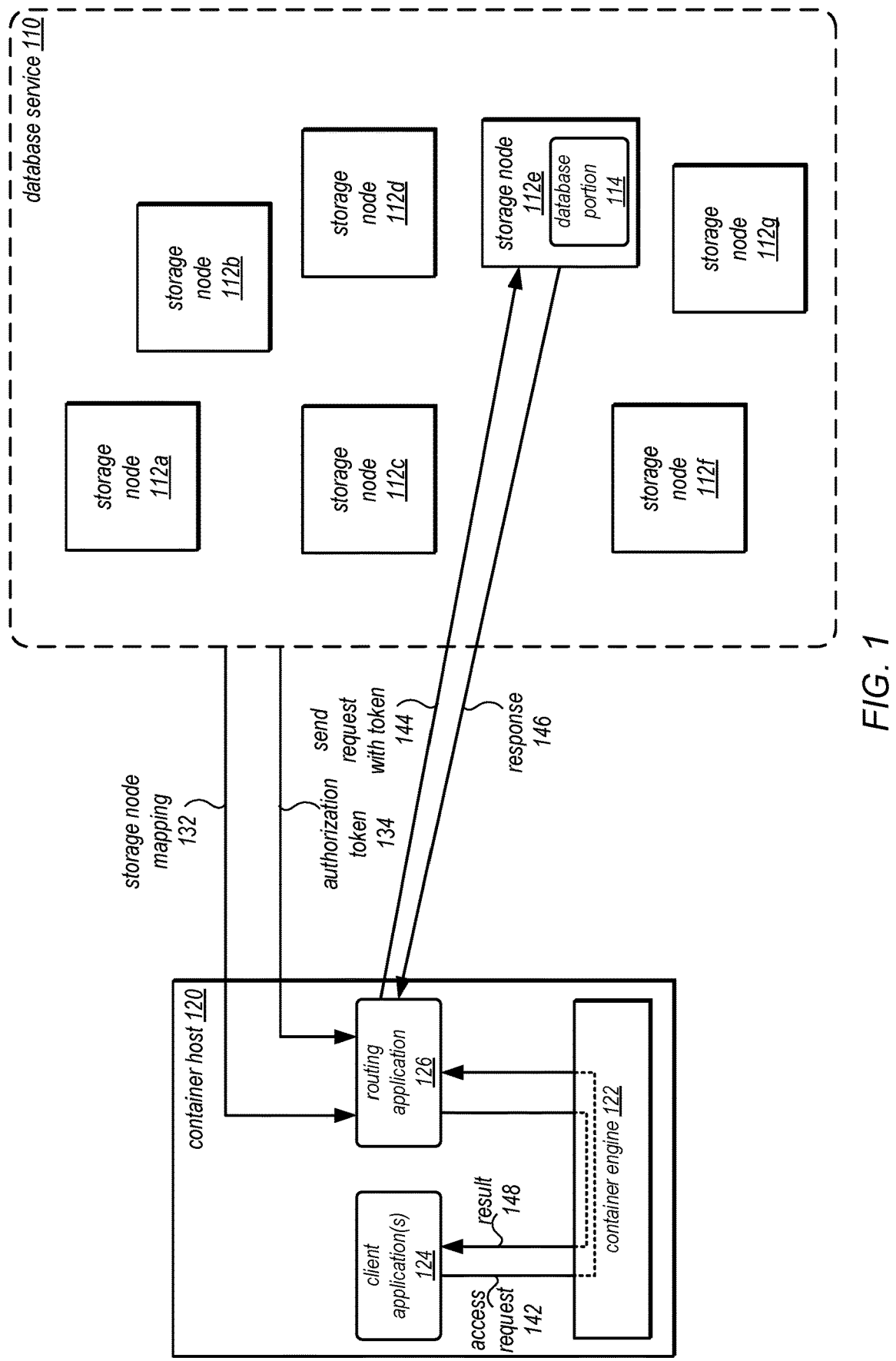
FIG. 1 is a logical block diagram illustrating localized lookups for efficient database service request processing, according to some embodiments.

FIG. 1 is a logical block diagram illustrating localized lookups for efficient database service request processing, according to some embodiments. Database service 110 may be a network-based service that stores multiple databases on behalf of different clients, users, or other applications. To accommodate the large number of databases, increase durability and provide availability, database service 110 may implement a large number of storage locations, such as storage nodes 112a, 112b, 112c, 112d, 112e, 112f, and 112g. Storage nodes 112 may be one (or more) computing devices, such as computing system 1000 discussed below with regard to FIG. 9, that host at least a portion, such as portion 114, of different databases. In some embodiments, storage nodes 112 may be multi-tenant, hosting different portions of different databases (e.g. for different clients) on a same storage node 112.

In order to identify where to perform a request, localized lookups for efficient database service request processing may be implemented to quickly identify and send client access requests to a database. For example, instead of utilizing a request router implemented as part of an architecture of database service 110 (or other architectural service feature, such as a request dispatcher, front-end, or other system or device that causes an additional network hop, request routing can be implemented local to the client application, saving network latency by reducing the number of network hops to reach the appropriate storage node 112.

For example, container host 120 may be computing system or device, similar to computing system 1000 discussed below with regard to FIG. 9. Container host 120 may implement container engine 122, which may provide a virtualization layer upon which different applications can be implemented (e.g., operating system virtualization) to utilize underlying host system resources (e.g., operating system, hardware resources such as processor, memory, network, storage, and so on). For example, one or more client application(s) 124 that utilize a database hosted in database service 110 may be implemented on container host 120 to perform various features, functions or services.

Routing application 126 may also be implemented on container host 120. When client application 124 sends an access request 142 to access a portion of a database (e.g., a record or item), such as portion 114, the access request 142 may be provided via container engine 122 to routing application 126. For example, container engine 122 may support network request from client application 124 but instead of routing the request over a network communication link outside of container host 120, the network request may be directly route to a network interface implemented for routing application 126. In this way, client application 124 requests may appear to be sent to database service 110, but may actually only processed, coordinated, or otherwise handled by container engine 122 (and/or other on-host resources) without leaving container host 120 and thus eliminating a network hop between client application(s) 124 and routing application 126.

Routing application may periodically (or aperiodically) obtain storage node mapping information 132 (which can be used to identify which storage nodes 112 store which databases (and individual portions thereof, such as partitions) from database service 110. Routing application 126 may also obtain an authorization token 134 to be used to verify (by a storage node 112) that access request 142 on behalf of client application 124 is valid, in some embodiments. Routing application may identify storage node 112e using the storage node mapping information and send a request with the token 144 to storage node 112e. Storage node 112e may verify the authorization using the token, perform the request upon database portion 114, and return a response, as indicated at 146. Different access requests may have different responses. A write request may have an acknowledgement, whereas a read request may have a value as the response 146. The response 146 may be used to generate (or be forwarded as) result 148 to client application 142 from routing application 126 via container engine 122, in some embodiments.

Please note that previous descriptions of a database service, container host, routing application, client application storage node, and container engine are not intended to be limiting, but are merely provided as logical examples.

This specification begins with a general description of a provider network that may implement a network-based service that is a database service that may implement localized lookups for efficient database serviced request processing. Then various examples of a database service are discussed, including different components/modules, or arrangements of components/module, that may be employed as part of implementing the database service, in some embodiments. A number of different methods and techniques to implement localized lookups for efficient database serviced request processing are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
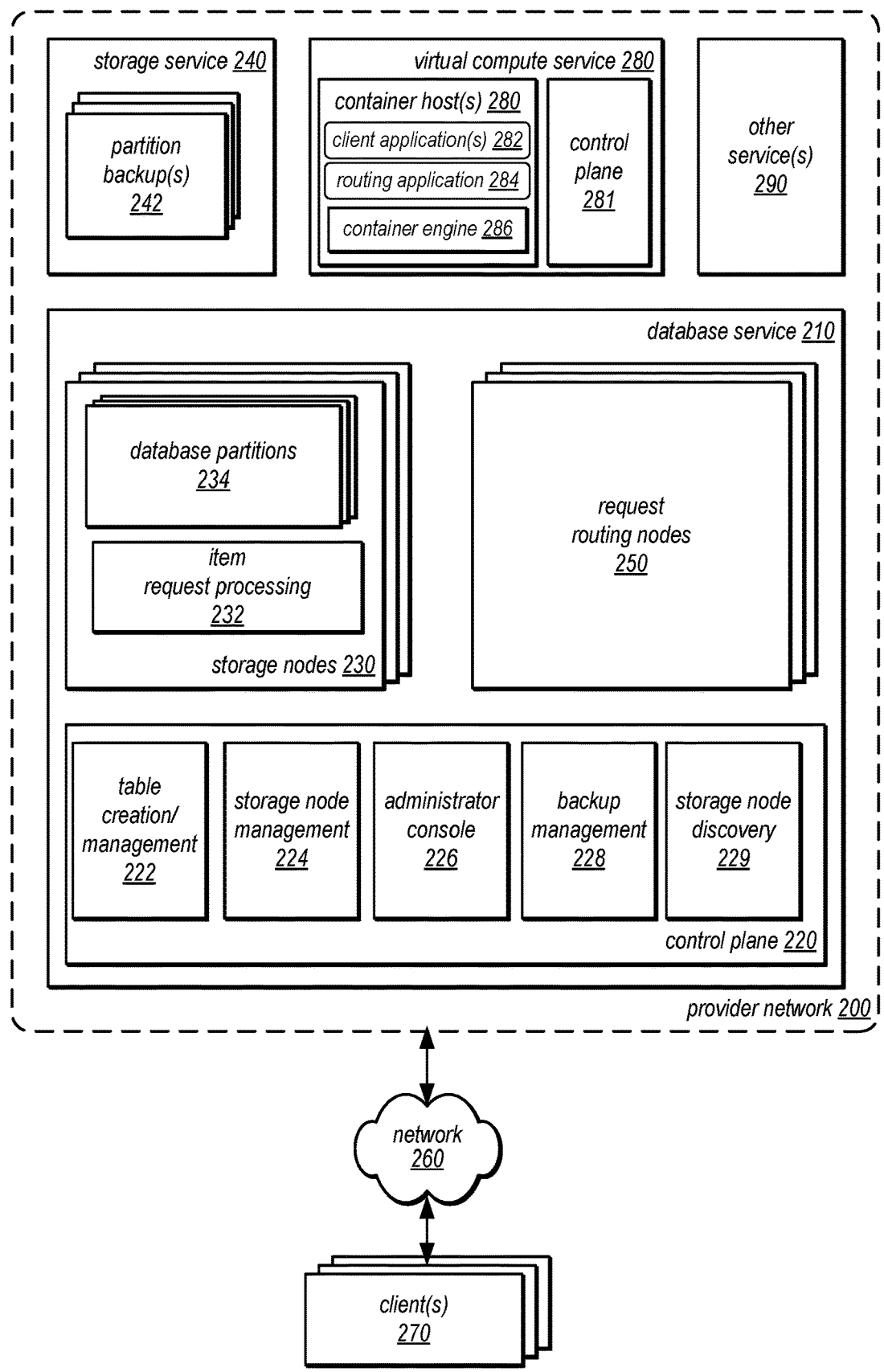
FIG. 2 is a logical block diagram illustrating a provider network offering a database service that may implement localized lookups for efficient database serviced request processing, according to some embodiments.

FIG. 2 is a logical block diagram illustrating a provider network offering a database service that may implement localized lookups for efficient database serviced request processing, according to some embodiments. Provider network 200 may be a private or closed system, in some embodiments, or may be set up by an entity such as a company or a public sector organization to provide one or more services (such as various types of cloud-based storage) accessible via the Internet and/or other networks to clients 270, in another embodiment. In some embodiments, provider network 200 may be implemented in a single location or may include numerous data centers hosting various resource pools, such as collections of physical and/or virtualized computer servers, storage devices, networking equipment and the like (e.g., computing system 1000 described below with regard to FIG. 9), needed to implement and distribute the infrastructure and storage services offered by the provider network 200.

For example, the provider network (which may, in some implementations, be referred to as a "cloud provider network" or simply as a "cloud") may refer to a pool of network-accessible computing resources (such as compute, storage, and networking resources, applications, and services), which may be virtualized or bare-metal (e.g., providing direct access to underlying hardware without a virtualization platform). In this way, the provider network can provide convenient, on-demand network access to a shared pool of configurable computing resources that can be programmatically provisioned and released in response to customer commands. These resources can be dynamically provisioned and reconfigured to adjust to variable load.

The provider network can be formed as a number of regions, where a region may be a separate geographical area in which the provider network clusters or manages data centers, in some embodiments. Each region may include two or more availability zones (sometimes referred to as fault tolerant zones) connected to one another via a private high speed network, for example a fiber communication connection. An availability zone (also known as an availability domain, or simply a "zone") may refer to an isolated failure domain including one or more data center facilities with separate power, separate networking, and separate cooling from those in another availability zone, in some embodiments. Preferably, availability zones within a region are positioned far enough away from one another that the same natural disaster should not take more than one availability zone offline at the same time, in some embodiments. Clients 270 can connect to availability zones of the provider network via a publicly accessible network (e.g., the Internet, a cellular communication network).

Regions may be connected to a global network which includes private networking infrastructure (e.g., fiber connections controlled by the cloud provider) connecting each region to at least one other region, in some embodiments. The provider network may deliver content from points of presence outside of, but networked with, these regions by way of edge locations and regional edge cache servers, in some embodiments. This compartmentalization and geographic distribution of computing hardware enables the provider network to provide low-latency resource access to customers on a global scale with a high degree of fault tolerance and stability.

In some embodiments, provider network 200 may implement various computing resources or services, such as database service 210 (e.g., a non-relational (NoSQL) database, relational database service or other database service that may utilize collections of items (e.g., tables that include items)), data storage service 240 (e.g., an object storage service, block-based storage service, or data storage service that may store different types of data for centralized access), virtual compute service 280, and other services (not illustrated), such as data flow processing service, and/or other large scale data processing techniques and/or any other type of network-based services (which may include various other types of storage, processing, analysis, communication, event handling, visualization, and security services).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), in some embodiments, each of which may be similar to the computer system embodiment illustrated in FIG. 9 and described below. In some embodiments, the functionality of a given system or service component (e.g., a component of key value database service 210) may be implemented by a particular node or may be distributed across several nodes. In some embodiments, a given node may implement the functionality of more than one service system component (e.g., more than one data store component).

Database service 210 may be implemented various types of distributed database services, in some embodiments, for storing, accessing, and updating data in tables hosted in key-value database. Such services may be enterprise-class database systems that are highly scalable and extensible. In some embodiments, access requests (e.g., requests to get/obtain items, put/insert items, delete items, update or modify items, scan multiple items) may be directed to a table in database service 210 that is distributed across multiple physical resources, and the database system may be scaled up or down on an as needed basis. In some embodiments, clients/subscribers may submit requests in a number of ways, e.g., interactively via graphical user interface (e.g., a console) or a programmatic interface to the database system. In some embodiments, database service 210 may provide a RESTful programmatic interface in order to submit access requests (e.g., to get, insert, delete, or scan data). In some embodiments, a query language (e.g., Structured Query Language (SQL) may be used to specify access requests.

In some embodiments, clients 270 may encompass any type of client configurable to submit network-based requests to provider network 200 via network 260, including requests for database service 210 (e.g., to create tables in database service 210 or to provision container host(s) 280 with routing application 284). For example, in some embodiments a given client 270 may include a suitable version of a web browser, or may include a plug-in module or other type of code module that executes as an extension to or within an execution environment provided by a web browser. Alternatively in a different embodiment, a client 270 may encompass an application such as a application (or user interface thereof), a media application, an office application or any other application that may make use of a service offered by provider network 200. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 270 may be an application that interacts directly with provider network 200, in some embodiments. In some embodiments, client 270 may generate network-based services requests according to a Representational State Transfer (REST)-style network-based services architecture, a document- or message-based network-based services architecture, or another suitable network-based services architecture. Note that in some embodiments, clients of database service 210 may be implemented within provider network 200 (e.g., applications hosted on a virtual compute service, such as client application(s) 282 which may perform similar requests as those discussed above but may be handled according to the various techniques discussed below with regard to FIGS. 3-8 by routing application 284).

Client(s) 270 may convey network-based services requests to and receive responses from provider network 200 via network 260, in some embodiments. In some embodiments, network 260 may encompass any suitable combination of networking hardware and protocols necessary to establish network-based-based communications between clients 270 and provider network 200. For example, network 260 may encompass the various telecommunications networks and service providers that collectively implement the Internet. In some embodiments, network 260 may also include private networks such as local area networks (LANs) or wide area networks (WANs) as well as public or private wireless networks. For example, both a given client 270 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client(s) 270 and the Internet as well as between the Internet and provider network 200. It is noted that in some embodiments, client(s) 270 may communicate with provider network 200 using a private network rather than the public Internet.

Database service 210 may implement request routing nodes 250, in some embodiments. Request routing nodes 250 may receive and parse access requests, in various embodiments in order to determine various features of the request, to parse, authenticate, throttle and/or dispatch access requests, among other things, in some embodiments. As discussed in detail below some access requests may not be sent to request routing nodes 250 as localized lookups may be performed instead (e.g., in FIG. 4). In other scenarios, request routing nodes 250 may be utilized, even when local routing is enabled (e.g., in FIG. 5).

In some embodiments, database service 210 may implement control plane 220 to implement one or more administrative components, such as automated admin instances which may provide a variety of visibility and/or control functions). In various embodiments, control plane 220 may direct the performance of different types of control plane operations among the nodes, systems, or devices implementing database service 210, in some embodiments. Control plane 220 may provide visibility and control to system administrators via administrator console 226, in some embodiment. Administrator console 226 may allow system administrators to interact directly with database service 210 (and/or the underlying system). In some embodiments, the administrator console 226 may be the primary point of visibility and control for database service 210 (e.g., for configuration or reconfiguration by system administrators). For example, the administrator console may be implemented as a relatively thin client that provides display and control functionally to system administrators and/or other privileged users, and through which system status indicators, metadata, and/or operating parameters may be observed and/or updated. Control plane 220 may provide an interface or access to information stored about one or more detected control plane events, such as data backup or other management operations for a table, at database service 210, in some embodiments.

Storage node management 224 may provide resource allocation, in some embodiments, for storing additional data in table submitted to database service 210. For instance, control plane 220 may communicate with processing nodes to initiate the performance of various control plane operations, such as moves of table partitions, splits of table partitions, update tables, delete tables, create indexes, etc. . . . In some embodiments, control plane 220 may include a node recovery feature or component that handles failure events for storage nodes 230, and request routing nodes 250 (e.g., adding new nodes, removing failing or underperforming nodes, deactivating or decommissioning underutilized nodes, etc.). Storage node management 224 may update storage node mapping information maintained by storage node discovery 229, in some embodiments.

Various durability, resiliency, control, or other operations may be directed by control plane 220. For example, storage node management 224 may detect split, copy, or move events for multi-table partitions at storage nodes in order to ensure that the storage nodes maintain satisfy a minimum performance level for performing access requests. For instance, in various embodiments, there may be situations in which a partition (or a replica thereof) may need to be copied, e.g., from one storage node to another. For example, if there are three replicas of a particular partition, each hosted on a different physical or logical machine, and one of the machines fails, the replica hosted on that machine may need to be replaced by a new copy of the partition on another machine. In another example, if a particular machine that hosts multiple partitions of one or more tables experiences heavy traffic, one of the heavily accessed partitions may be moved (using a copy operation) to a machine that is experiencing less traffic in an attempt to more evenly distribute the system workload and improve performance. In some embodiments, storage node management 224 may perform partition moves using a physical copying mechanism (e.g., a physical file system mechanism, such as a file copy mechanism) that copies an entire partition from one machine to another, rather than copying a snapshot of the partition data row by. While the partition is being copied, write operations targeting the partition may be logged. During the copy operation, any logged write operations may be applied to the partition by a catch-up process at periodic intervals (e.g., at a series of checkpoints). Once the entire partition has been copied to the destination machine, any remaining logged write operations (i.e. any write operations performed since the last checkpoint) may be performed on the destination partition by a final catch-up process. Therefore, the data in the destination partition may be consistent following the completion of the partition move, in some embodiments. In this way, storage node management 224 can move partitions amongst storage nodes 230 while the partitions being moved are still "live" and able to accept access requests.

In some embodiments, the partition moving process described above may be employed in partition splitting operations by storage node management 224 in response to the detection of a partition split event. For example, a partition may be split because it is large, e.g., when it becomes too big to fit on one machine or storage device and/or in order to keep the partition size small enough to quickly rebuild the partitions hosted on a single machine (using a large number of parallel processes) in the event of a machine failure. A partition may also be split when it becomes too "hot" (i.e. when it experiences a much greater than average amount of traffic as compared to other partitions). For example, if the workload changes suddenly and/or dramatically for a given partition, the system may be configured to react quickly to the change. In some embodiments, the partition splitting process described herein may be transparent to applications and clients/users, which may allow the data storage service to be scaled automatically (i.e. without requiring client/user intervention or initiation).

In some embodiments, each database partition 234 may be identified by a partition ID, which may be a unique number (e.g., a GUID) assigned at the time the partition is created. A partition 234 may also have a version number that is incremented each time the partition goes through a reconfiguration (e.g., in response to adding or removing replicas, but not necessarily in response to a master failover). When a partition is split, two new partitions may be created, each of which may have a respective new partition ID, and the original partition ID may no longer be used, in some embodiments. In some embodiments, a partition may be split by the system using a split tool or process in response to changing conditions.

Split or move events may be detected by storage node management 224 in various ways. For example, partition size and heat, where heat may be tracked by internally measured metrics (such as IOPS), externally measured metrics (such as latency), and/or other factors may be evaluated with respect to various performance thresholds.

System anomalies may also trigger split or move events (e.g., network partitions that disrupt communications between replicas of a partition in a replica group, in some embodiments. Storage node management 224 may detect storage node failures, or provide other anomaly control, in some embodiments. If the partition replica hosted on the storage node on which a fault or failure was detected was the master for its replica group, a new master may be elected for the replica group (e.g., from amongst remaining storage nodes in the replica group). Storage node management 224 may initiate creation of a replacement partition replica while the source partition replica is live (i.e. while one or more of the replicas of the partition continue to accept and service requests directed to the partition), in some embodiments. In various embodiments, the partition replica on the faulty storage node may be used as the source partition replica, or another replica for same partition (on a working machine) may be used as the source partition replica, e.g., depending type and/or severity of the detected fault.

Control plane 220 may implement table creation and management 222 to manage the creation (or deletion) of database tables hosed in database service 210, in some embodiments. For example, a request to create a table may be submitted via administrator console 226 which may initiate performance of a workflow to generate appropriate system metadata (e.g., a table identifier that is unique with respect to all other tables in database service 210, table performance or configuration parameters, etc.). Table creation/management 222 may also implement features to monitor and/or handle admission control (e.g., allocating resources and monitoring workloads to ensure that requested performance, such as a number of requests or operations per second, is achieved, and implementing/instructing control measures to ensure that requests to a table do not exceed provisioned or other threshold amounts in order to guarantee system performance overall. For example, individual storage nodes 230 may report or provide information describing a number and/or rate of access requests to tables and table creation/management 22 may provide admission information to request routing nodes 250 and routing application(s) 284 (e.g., via storage node discovery 229 as discussed below with regard to FIG. 4), in order to perform admission control decisions for individual requests and perform admission control actions (e.g., throttle or otherwise drop a request that exceeds an allowed threshold).

Backup management 228 may handle the creation of backup requests to make copies as of a version or point-in-time of a database, as backup partitions 242 in storage service 240. Storage node discovery 229, as discussed below with regard to FIGS. 4, 6A, and 6B, may be used to maintain, track, and/or provide storage node mapping information, authorization tokens, and/or admission control information. In some embodiments, separate systems or services may be implemented to provide one (or different combinations) of mapping information, authorization tokens, and/or admission control information.

In some embodiments, database service 210 may also implement a plurality of storage nodes 230, each of which may manage one or more partitions of a database table on behalf of clients/users or on behalf of database service 210 which may be stored in database storage 234 (on storage devices attached to storage nodes 230 or in network storage accessible to storage nodes 230).

Storage nodes 230 may implement item request processing 232, in some embodiments. Item request processing 232 may perform various operations (e.g., read/get, write/update/modify/change, insert/add, or delete/remove) to access individual items stored in tables in database service 210, in some embodiments. In some embodiments, item request processing 232 may support operations performed as part of a transaction, including techniques such as locking items in a transaction and/or ordering requests to operate on an item as part of transaction along with other requests according to timestamps (e.g., timestamp ordering) so that storage nodes 230 can accept or reject the transaction-related requests. In some embodiments, item request processing 232 may maintain database partitions 234 according to a database model (e.g., a non-relational, NoSQL, or other key-value database model). In some embodiments, item request processing can perform validation of authorization tokens for requests received from routing applications. As discussed below with regard to FIG. 4, in some embodiments, item request processing 232 can verify authorization tokens to determine whether a request should be accepted or denied.

In addition to dividing or otherwise distributing data (e.g., database tables) across storage nodes 230 in separate partitions, storage nodes 230 may also be used in multiple different arrangements for providing resiliency and/or durability of data as part of larger collections or groups of resources. A replica group, for example, may be composed of a number of storage nodes maintaining a replica of particular portion of data (e.g., a partition) for the database service 210. Moreover, different replica groups may utilize overlapping nodes, where a storage node 230 may be a member of multiple replica groups, maintaining replicas for each of those groups whose other storage node 230 members differ from the other replica groups.

Different models, schemas or formats for storing data for database tables in database service 210 may be implemented, in some embodiments. For example, in some embodiments, non-relational, NoSQL, semi-structured, or other key-value data formats may be implemented. In at least some embodiments, the data model may include tables containing items that have one or more attributes. In such embodiments, each table maintained on behalf of a client/user may include one or more items, and each item may include a collection of one or more attributes. The attributes of an item may be a collection of one or more name-value pairs, in any order, in some embodiments. In some embodiments, each attribute in an item may have a name, a type, and a value. In some embodiments, the items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s). In other words, the tables maintained by the database service 210 (and the underlying storage system) may have no predefined schema other than their reliance on the primary key.

Metadata or other system data for tables may also be stored as part of database partitions using similar partitioning schemes and using similar indexes, in some embodiments.

Database service 210 may provide an application programming interface (API) for requesting various operations targeting tables, indexes, items, and/or attributes maintained on behalf of storage service clients. In some embodiments, the service (and/or the underlying system) may provide both control plane APIs and data plane APIs. The control plane APIs provided by database service 210 (and/or the underlying system) may be used to manipulate table-level entities, such as tables and indexes and/or to re-configure various tables These APIs may be called relatively infrequently (when compared to data plane APIs). In some embodiments, the control plane APIs provided by the service may be used to create tables or secondary indexes for tables at separate storage nodes, import tables, export tables, delete tables or secondary indexes, explore tables or secondary indexes (e.g., to generate various performance reports or skew reports), modify table configurations or operating parameter for tables or secondary indexes, and/or describe tables or secondary indexes, and create and/or associate functions with tables. In some embodiments, control plane APIs that perform updates to table-level entries may invoke asynchronous workflows to perform a requested operation. Methods that request "description" information (e.g., via a describe Tables API) may simply return the current known state of the tables or secondary indexes maintained by the service on behalf of a client/user. The data plane APIs provided by database service 210 (and/or the underlying system) may be used to perform item-level operations, such as requests for individual items or for multiple items in one or more tables table, such as queries, batch operations, and/or scans.

The APIs provided by the service described herein may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

Database service 210 may include support for some or all of the following operations on data maintained in a table (or index) by the service on behalf of a storage service client: enabled localized routing (as discussed below with regard to FIG. 3), perform a transaction (inclusive of one or more operations on one or more items in one or more tables), put (or store) an item, get (or retrieve) one or more items having a specified primary key, delete an item, update the attributes in a single item, query for items using an index, and scan (e.g., list items) over the whole table, optionally filtering the items returned, or conditional variations on the operations described above that are atomically performed (e.g., conditional put, conditional get, conditional delete, conditional update, etc.). For example, the database service 210 (and/or underlying system) described herein may provide various data plane APIs for performing item-level operations, such as a TransactItems API, PutItem API, a GetItem (or GetItems) API, a DeleteItem API, and/or an UpdateItem API, as well as one or more index-based seek/traversal operations across multiple items in a table, such as a Query API and/or a Scan API.

Storage service 240 may be file, object-based, or other type of storage service that may be used to store backups 242. Storage service 240 may implement striping, sharding, or other data distribution techniques so that different portions of a partition backup 242 are stored across multiple locations (e.g., at separate nodes).

Virtual compute service 280 may offer virtualized computing resources for use by applications. In some embodiments, virtual compute service 280 may offer container-based virtualization. For example, container host(s) 280 may be implemented that include a container engine 286 for virtualizing an operating system on behalf of multiple different applications, such as client application(s) 282 and routing application 284, in some embodiments. Client application(s) 282 may be uploaded, provided, and/or otherwise installed on container host(s) 280 as images specified in one (or more) requests directed to control plane 281 (e.g., by clients 270). As discussed below with regard to FIG. 3, virtual compute service 280 may support requests to enable local routing by deploying a routing application 284 that is then provisioned for one or more client application(s) 284. Virtual compute service 281 may implement a control plane to perform various management techniques for virtual compute service 280, including provisioning as discussed below with regard to FIG. 3.

Figure 3:
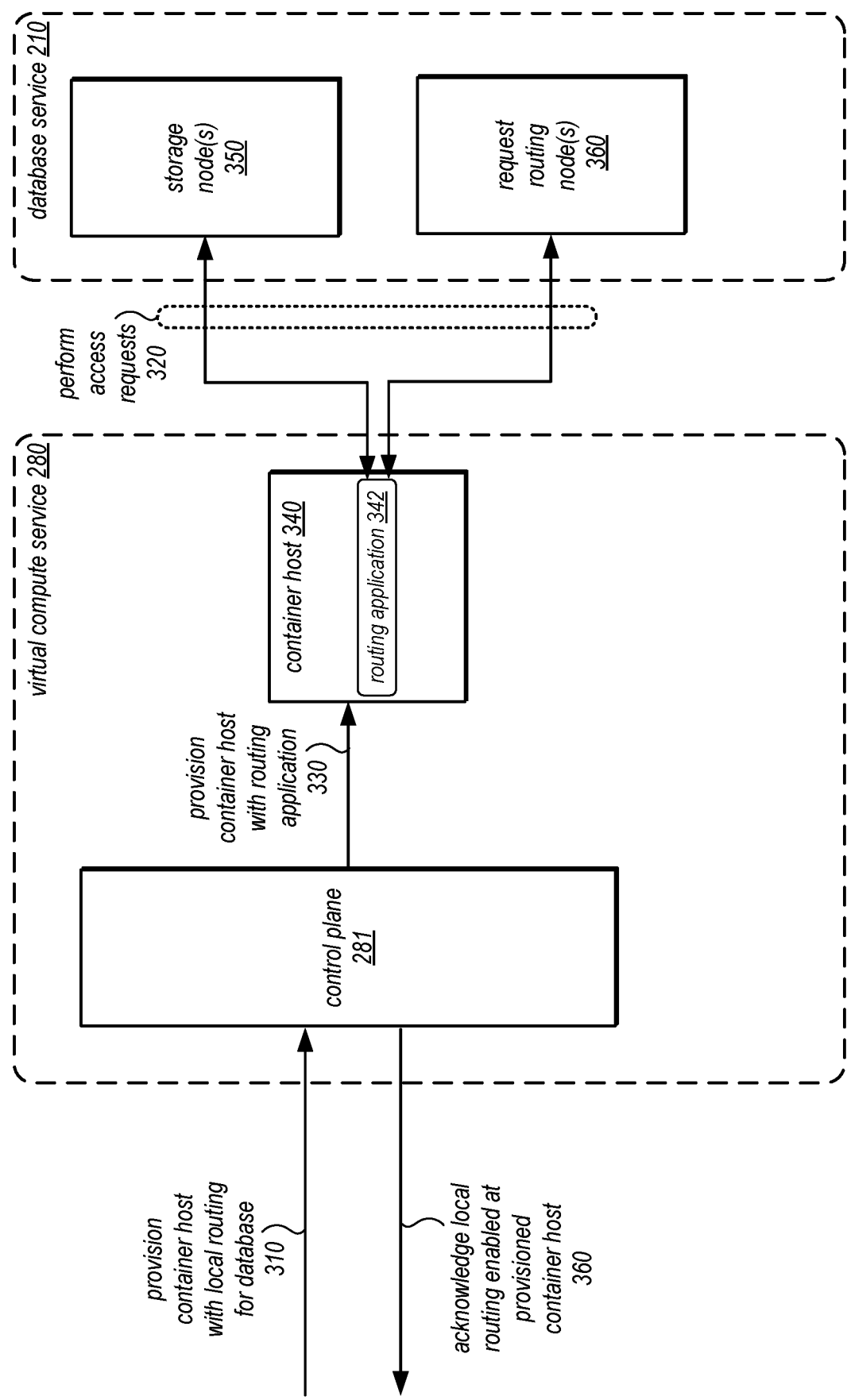
FIG. 3 is a logical block diagram illustrating enabling localized lookups for efficient database serviced request processing, according to some embodiments.

FIG. 3 is a logical block diagram illustrating enabling localized lookups for efficient database serviced request processing, according to some embodiments. Virtual compute service 280 may support requests to enable or otherwise deploy local routing for a table (or database), such as via an API request. For example, a request to provision a container host with local routing for a database, as indicated at 310 may be received by table creation management 222. Control plane 281 may provision, as indicated at 330, a container host 340. Container host 340 may have routing application 342 for routing requests to database service 210 installed, deployed, or otherwise executing on container host 340.

Control plane 281 may identify the provisioned container host 350 as part of an acknowledgement that local routing is enabled at the provisioned container host, as indicated at 360. In this way, an identifier or other information may be provided that can allow for a client application to be deployed on container host 340 in order to use routing application 342. In some embodiments, information to access routing application 342 may be provided as part of application 260 (e.g., network address information, interface format, or other information) in order to configure a client application to send requests to routing application 342. In other embodiments, a client application may not need to be specially implemented to direct requests to routing application 342, but instead the service endpoint or other target of database service access requests, such as requests 320, may be automatically routed to routing application 342 by container host 340 (e.g., via container engine) which may determine whether to perform access requests 320 to storage node(s) 350 or request routing node(s) 360.

Figure 4:
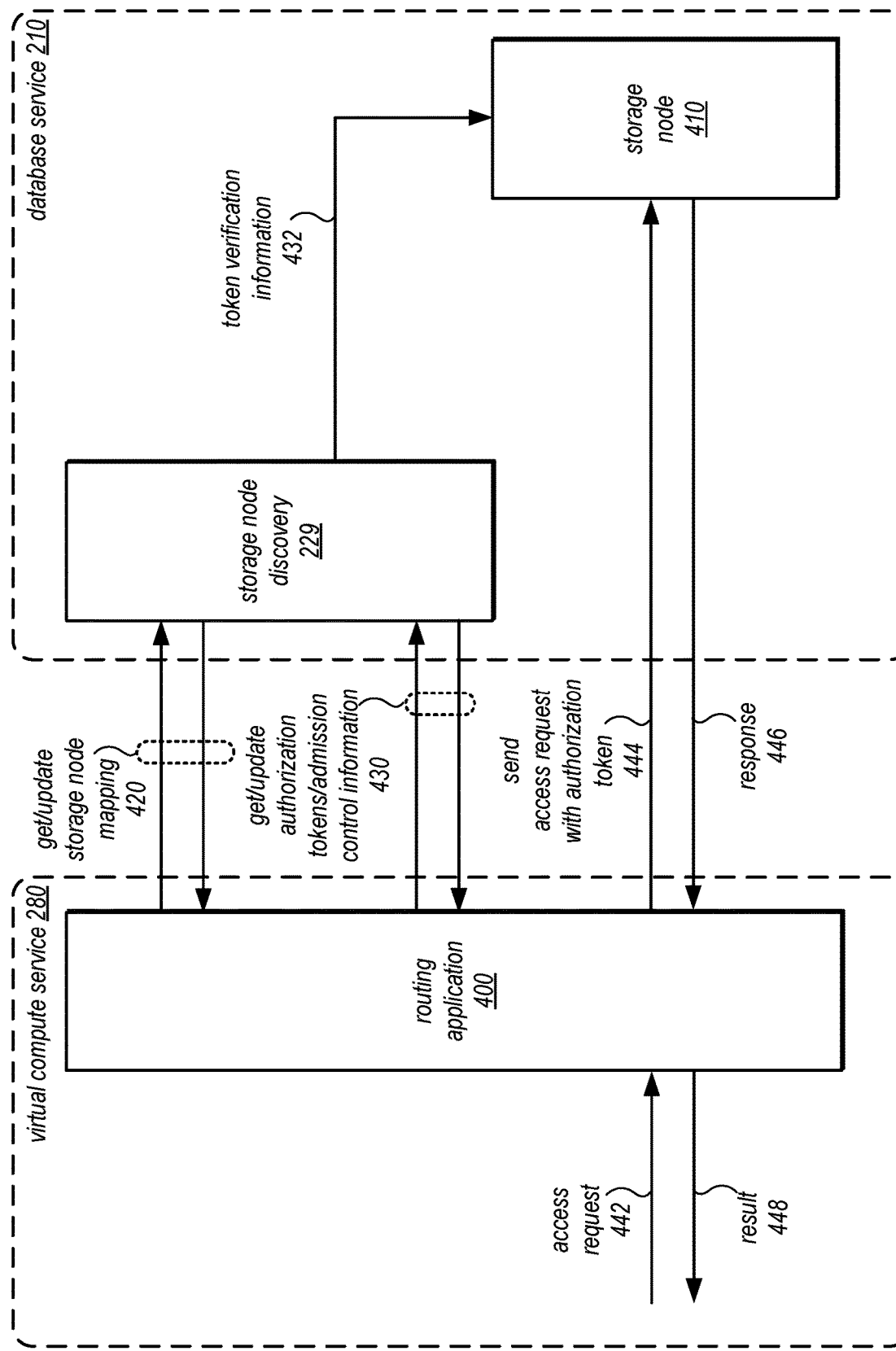
FIG. 4 is a logical block diagram illustrating local request routing, according to some embodiments.

FIG. 4 is a logical block diagram illustrating local request routing, according to some embodiments. Routing application 400 may periodically obtain storage node mapping information 420 from storage node discovery 229, in some embodiments. For example, periodic requests may be sent to check for updates. Similarly, an authorization token 430 may be gotten or updated from storage node discovery 229. For example, a time to live (TTL) may be specified for an authorization token, after which routing application 400 may have to obtain a new authorization token.

As noted earlier, admission control may be enforced for database tables (overall) or with respect to individual database partitions stored at storage nodes. For example, routing application 400 may apply local admission controls by counting or tracking the number of requests/operations directed to particular partitions or tables from the co-located client application and perform throttling (e.g., dropping requests) or other admission control actions if the locally tracked information exceeds request thresholds or limits specific to a partition or table. In some embodiments, global admission control techniques may be implemented which limit access to a table overall (e.g., by collecting access request information across all clients access a table/partition) and making admission decisions for individual requests based on global admission information (e.g., the access request information for threshold evaluation). As illustrated in FIG. 4, admission control information 430 may be passed as part of authorization token information, in some embodiments, in order to reduce the number of communications. In some embodiments, admission control information may be provided separately and/or from a different control plane component (e.g., table creation/management 222).

Access request 442 may be received at routing application 400 (e.g., from a client application at the same container host). Routing application 400 may send the access request with authorization token 444 to storage node 410. Storage node 410 may validate or otherwise verify permissions in the authorization token. For example, a symmetric encryption technique (e.g., a same digital certificate) may be used to sign the token and decrypt the token, in some embodiments. A certificate or other information used to verify a token may be provided by storage node discovery service 229 to storage node 410 as indicated at 432 in some embodiments. If the token is not valid, then storage node 410 may send an error message (which may cause routing application 400 to get another authorization token or determine that the client application does not have authorization and reject the access request). Similarly, if the storage node 410 does not have the partition to which the access request is directed, then an error indication may be sent, which may cause routing application 400 to request updated storage node mapping information.

For valid requests, storage node 410 may perform the access request on the data and send a response 446. Routing application 400 may then generate and send a result 448 based on response 446. Although only a single storage node is depicted in FIG. 4, in some embodiments, multiple storage nodes may be queried in order to obtain and generate result 448.

Figure 5:
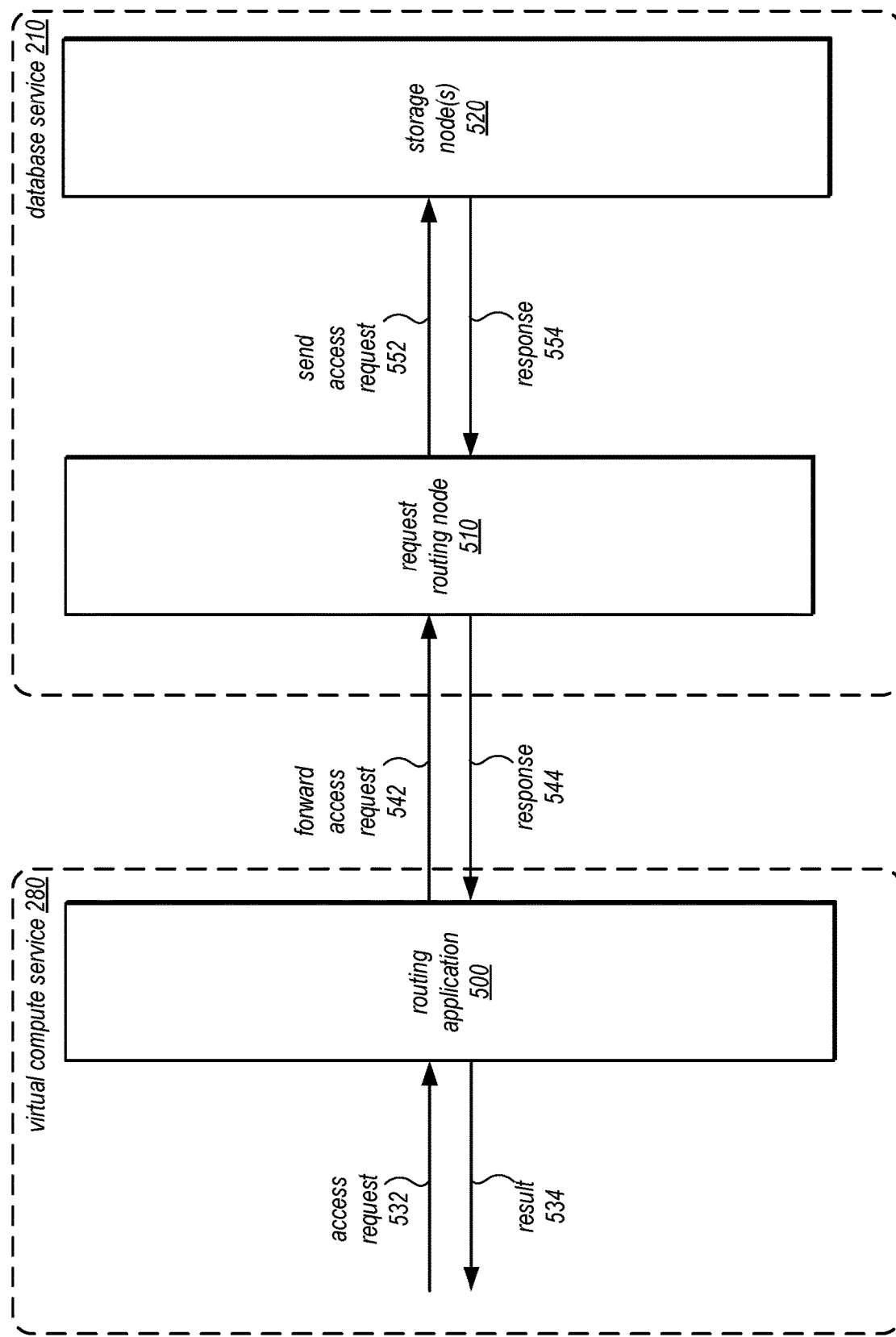
FIG. 5 is a logical block diagram illustrating request router handling instead of localized lookups, according to some embodiments.

In some cases, a request router may be used instead of the routing application to perform lookups. FIG. 5 is a logical block diagram illustrating request router handling instead of localized lookups, according to some embodiments. Routing application 500 may receive access request 532. As discussed below with regard to FIG. 8, the request may be better (or only) performed by a request router, such as request router 510. Routing application 500 may forward the access request 542 to request router 510. Request router 510 may perform the lookup and identify storage node(s) 520 to send the access request, as indicated at 552. Response 554 from storage node(s) 520 may be returned to request router 510, which in turn may send a response 544 to use by routing application 500 to send as result 534 for access request 532, in some embodiments.

Figure 6A:
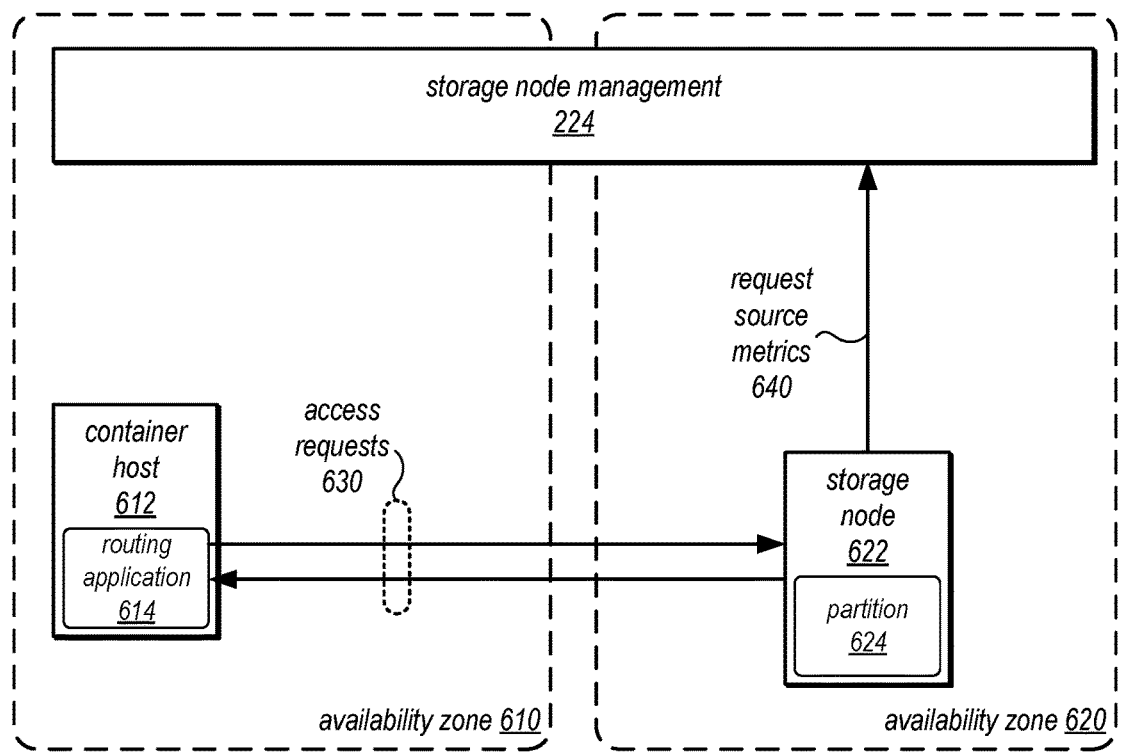
FIGS. 6A-6B are logical block diagrams illustrating partition migration for localized lookups, according to some embodiments.
Figure 6B:
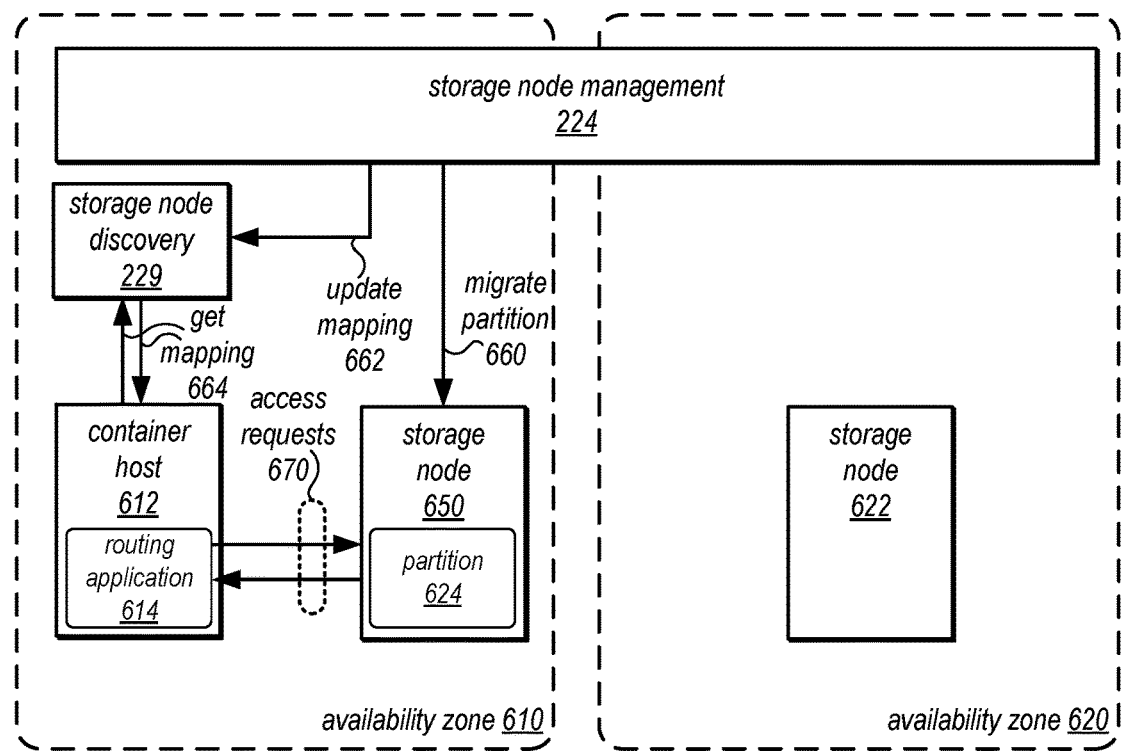

FIGS. 6A-6B are logical block diagrams illustrating partition migration for localized lookups, according to some embodiments. In FIG. 6A, different availability zones, as discussed above with regard to FIG. 2, may be utilized, such as availability zone 610 and 620. Storage node 622 may be located in availability zone 620 and store partition 624 that is accessed 630 by routing application 614 on behalf of a client application at container host 612. Storage node 622 may report request source metrics 640 to storage node management 224.

Based on request source metrics 640, storage node management 224 can identify opportunities to further increase request performance by co-locating a partition in a same availability zone as the routing application, reducing request latency. For example, as illustrated in FIG. 6B, storage node management 224 may migrate the partition 624, as indicated at 660 from storage node 622 to storage node 650. In this way partition 624 is now in the same availability zone 610 as routing application 614 (reducing network latency for access requests 670). Storage node management may update mapping, as indicated at 622, at storage node discovery 229. Container host 612 may get, as indicated at 664, the updated mapping to identify storage node 650 as storing partition 624 and perform access requests 670.

Figure 7:
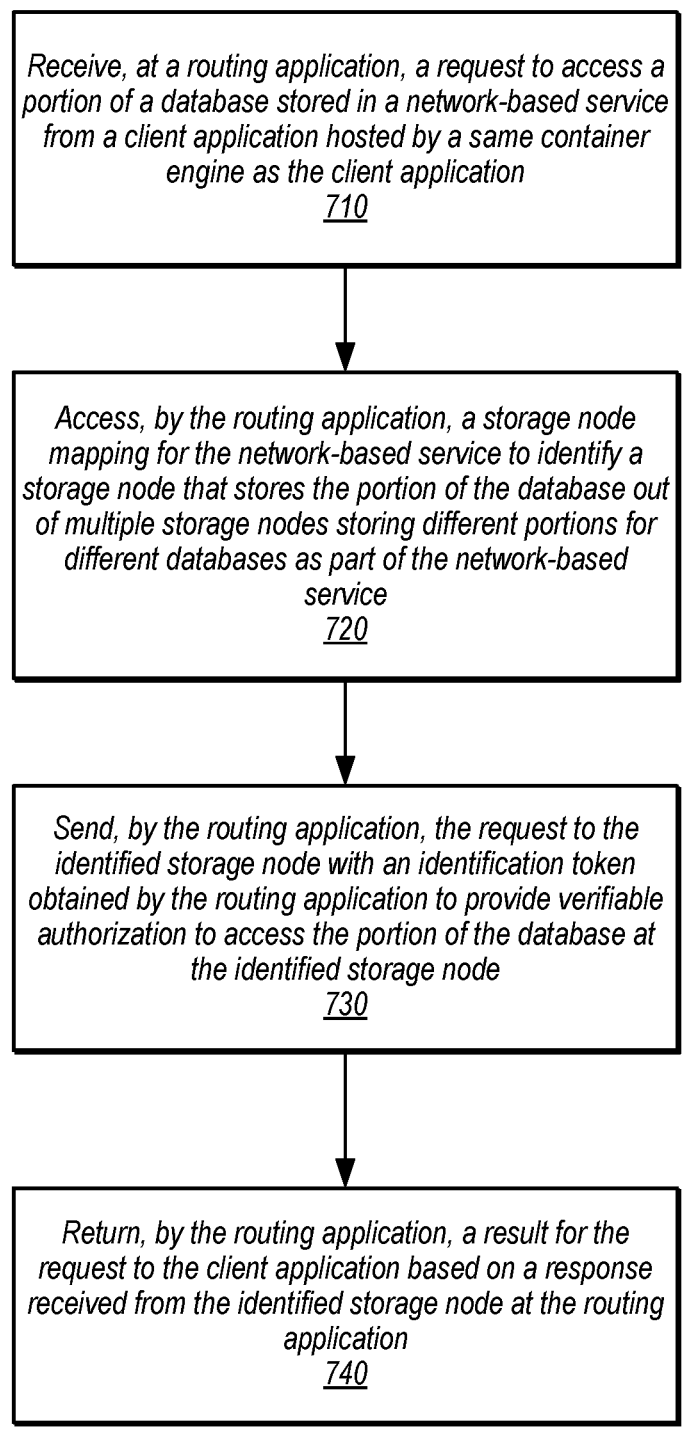
FIG. 7 is a high-level flowchart illustrating various methods and techniques to perform localized lookups for efficient database service request processing, according to some embodiments.

The examples of a network-based service that implements a database and performs localized lookups for efficient database service request processing as discussed in FIGS. 2-6B above have been given in regard to a database service (e.g., relational database, document database, non-relational database, etc.). However, various other types of database systems can advantageously implement associating a function with a table in a database system, in other embodiments. FIG. 7 is a high-level flowchart illustrating various methods and techniques to perform localized lookups for efficient database service request processing, according to some embodiments. These techniques, as well as the techniques discussed with regard to FIG. 8, may be implemented using components or systems as described above with regard to FIGS. 2-6B, as well as other types of databases or storage systems, and thus the following discussion is not intended to be limiting as to the other types of systems that may implement the described techniques.

As indicated at 710, a request to access a portion of a database may be received at a routing application, in some embodiments. The routing application may be hosted by a same container engine as the client application, in some embodiments, and may be located on a same container host. The database may be stored in a network-based service that uses multiple storage nodes and/or distributes database data across multiple locations, in some embodiments.

As indicated at 720, the routing application may access a storage node mapping for the network-based service to identify a storage node that stores the portion of the database out of multiple storage nodes storing different portions for different databases as part of the network-based database service. For example, the storage node mapping may be maintained locally by the routing application and/or periodically updated by a centralized system or service that is aware of the various movements or database data amongst the storage nodes, in some embodiments, as discussed above with regard to FIG. 4.

In some embodiments, throttling or other request limitations implemented as part of admission control may be checked before allowing the request to proceed. For example, a client application may be limited to a number requests or operations caused by the requests in a given time period. If the number is exceeded, then throttling techniques may be applied to the request (e.g., drop the request). Such techniques may be based on local and/or global admission information, in some embodiments.

As indicated at 730, the request may be sent by the routing application to the identified storage node with an identification token obtained by the routing application to provide verifiable authorization to access the portion of the database at the identified storage node, in some embodiments. For example, the request may be formatted and sent according to the interface implemented by the identified storage node. As indicated at 740, a result may be returned by the routing application to the client application based on a response from the identified storage node at the routing application, in some embodiments. For example, an acknowledgement of a write may be sent, or result values of a read, scan, and/or query may be sent.

Figure 8:
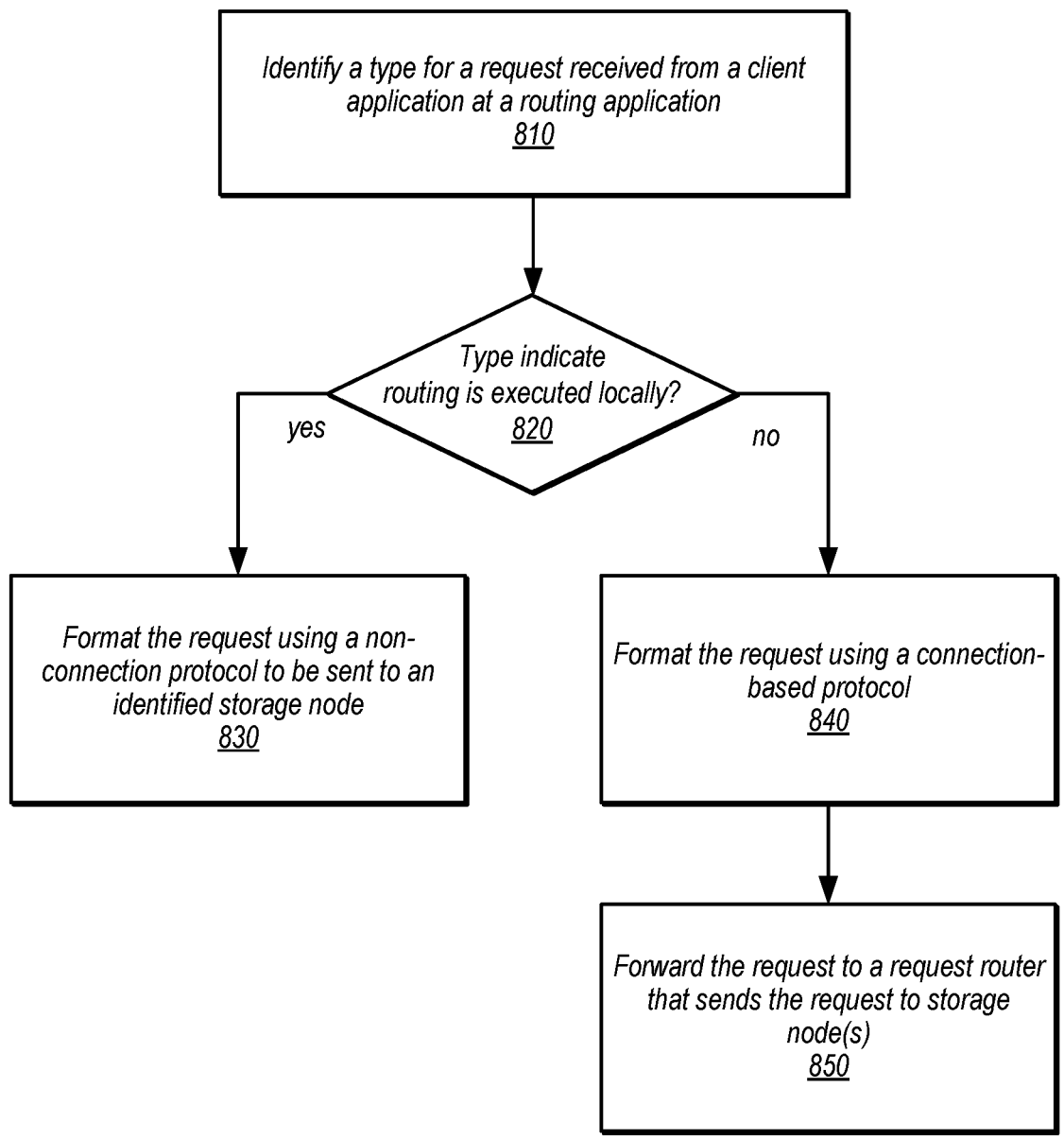
FIG. 8 is a high-level flowchart illustrating various methods and techniques to handle different types of access requests, according to some embodiments.

In some cases, different types of access requests may not be handled directly by a routing application. FIG. 8 is a high-level flowchart illustrating various methods and techniques to handle different types of access requests, according to some embodiments. For example, as indicated at 810, a type for a request received from a client application at a routing application may be identified, in some embodiments. If, for instance, the request is a singleton operation (e.g., a single read or write of a single item), then the type may indicate that routing is executed locally, as determined at 820. Then, the request may be formatted using a non-connection protocol to be sent to the identified storage node (e.g., UDP).

If the type indicates that routing is not (or cannot) be executed locally, as indicated by the negative exit from 820 (e.g., the request is scan, query, transaction, or other multi-operation request), then the request may be formatted using a connection-based protocol, in some embodiments. (e.g. TCP). Then, as indicated at 850, the request may be forwarded to a request router that sends the request to the storage node(s) 850.

The methods described herein may in various embodiments be implemented by any combination of hardware and software. For example, in some embodiments, the methods may be implemented by a computer system (e.g., a computer system as in FIG. 9) that includes one or more processors executing program instructions stored on a computer-readable storage medium coupled to the processors. The program instructions may implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Embodiments to implement perform localized lookups for efficient database service request processing as described herein may be executed on one or more computer systems, which may interact with various other devices. One such computer system is illustrated by FIG. 9. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or compute node, computing device or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device, keyboard, and display(s). Display(s) may include standard computer monitor(s) and/or other display systems, technologies or devices, in some embodiments. In some embodiments, it is contemplated that embodiments may be implemented using a single instance of computer system 1000, while in other embodiments multiple such systems, or multiple nodes making up computer system 1000, may host different portions or instances of embodiments. For example, in some embodiments some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions, in some embodiments. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device, in some embodiments. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in some embodiments.

System memory 1020 may store program instructions 1025 and/or data accessible by processor 1010 to implement associating a function with a table in a database system, in some embodiments. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. A computer-accessible medium may include non-transitory storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040, in some embodiments.

In some embodiments, I/O interface 1030 may be coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000, in some embodiments. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000, in some embodiments. Multiple input/output devices 1050 may be present in computer system 1000 or may be distributed on various nodes of computer system 1000, in some embodiments. In some embodiments, similar input/output devices may be separate from computer system 1000 and may interact with one or more nodes of computer system 1000 through a wired or wireless connection, such as over network interface 1040.

Figure 9:
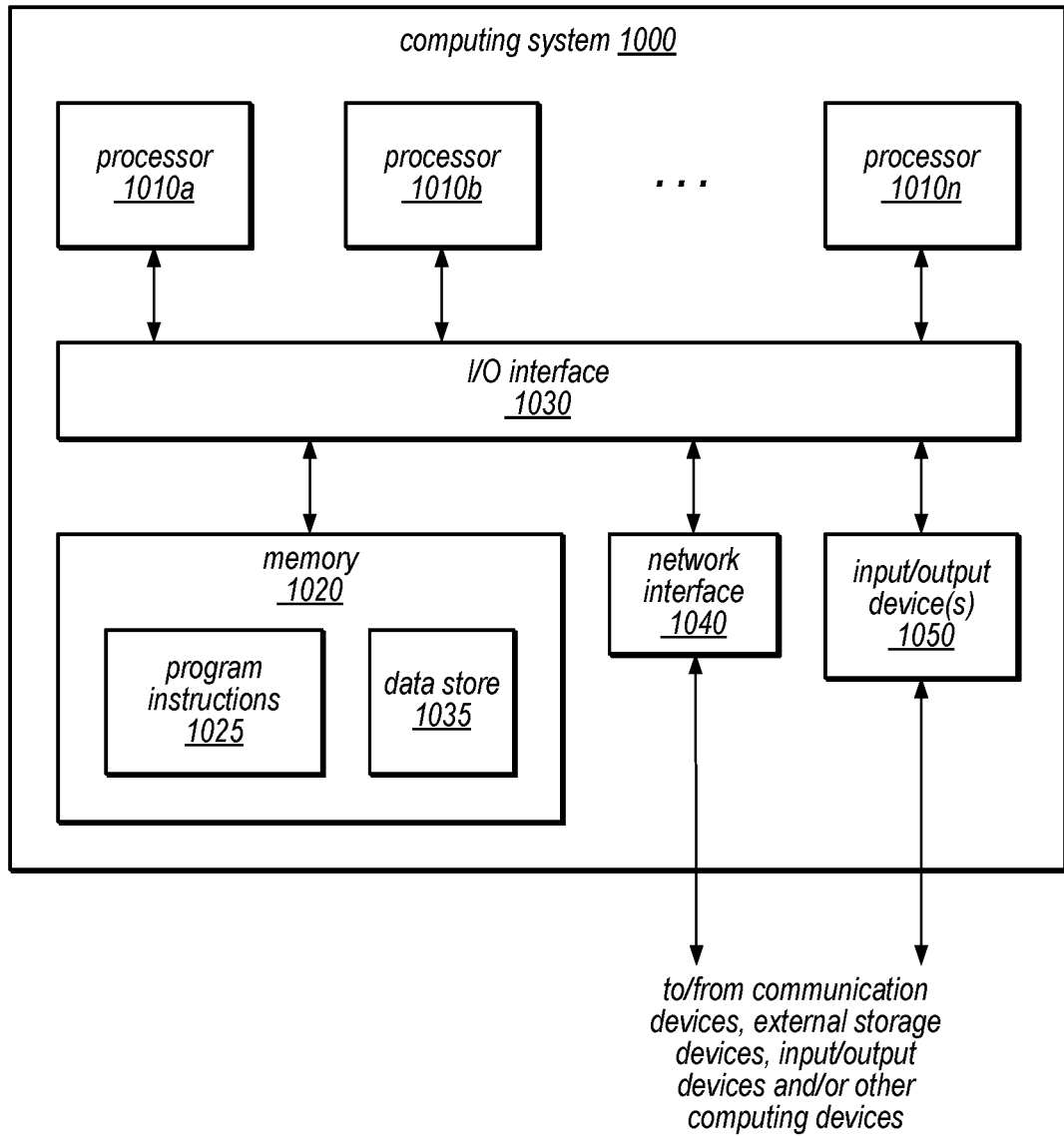
FIG. 9 is a block diagram illustrating an example computing system, according to some embodiments.

As shown in FIG. 9, memory 1020 may include program instructions 1025, that implement the various embodiments of the systems as described herein, such as techniques to implement localized request routing for efficient database access, and data store 1035, comprising various data accessible by program instructions 1025, in some embodiments. In some embodiments, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1000 may be transmitted to computer system 1000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
    at least one processor; and
    a memory, storing program instructions that when executed by the at least one processor, cause the at least one processor to implement a routing application hosted by a container engine, the routing application configured to:
        obtain a storage node mapping for a network-based service, the network-based service comprising a plurality of storage nodes that store different respective portions of a plurality of databases;
        obtain an identification token that indicates authorization for a client application hosted by the container engine to access one of the plurality of databases;
        receive a request to access a portion of the database from the client application;
        identify one of the plurality of storage nodes that stores the portion of the database according to the storage node mapping;
        send the request to the identified storage node with the identification token for the identified storage node to verify the authorization of the client application to access the portion of the database at the identified storage node;
        receive a response for the request from the identified storage node; and
        return a result for the request to the client application based, at least in part, on the received response.

2. The system of claim 1, wherein the routing application is configured to obtain the storage node mapping in response to receiving an error response from a different one of the storage nodes that was sent the request.

3. The system of claim 1, wherein the routing application is further configured to:
    receive another request to access another portion of the database;
    identify a type for the other request; and
    forward the other request to a request router for the network-based service to perform the other request according to the type.

4. The system of claim 1, wherein the container host is provisioned by a virtual compute service offered by a provider network that also offers the network-based service responsive to a request to provision the container host with local routing received at the network-based service.

5. A method, comprising:
    receiving, at a routing application, a request to access a portion of a database stored in a network-based service from a client application hosted by a same container engine as the routing application, the network-based service comprising a plurality of storage nodes that store different respective portions of a plurality of databases including the database;
    accessing, by the routing application, a storage node mapping for the network-based service to identify one of the plurality of storage nodes that stores the portion of the database;
    sending, by the routing application, the request to the identified storage node with an identification token obtained by the routing application to provide verifiable authorization to access the portion of the database at the identified storage node; and returning, by the routing application, a result for the request to the client application based, at least in part, on a response received from the identified storage node at the routing application.

6. The method of claim 5, further comprising periodically, by the routing application, obtaining one or more updates to the storage node mapping for handling subsequent access requests.

7. The method of claim 5, further comprising periodically, by the routing application, obtaining the authorization token to include with requests to the database for the client application.

8. The method of claim 5, further comprising:
obtaining the authorization token in response to receiving an error response from a different one of the storage nodes that was sent the request indicating that another version of the authorization token was invalid.

9. The method of claim 5, further comprising:
receiving, by the routing, application, another request to access another portion of the database;
identifying, by the routing, application, a type for the other request; and
forwarding, by the routing, application, the other request to a request router for the network-based service to perform the other request according to the type.

10. The method of claim 5, further comprising formatting the request using a non-connection protocol before sending the request to the identified storage node.

11. The method of claim 5, wherein the request to access the portion of the database is determined to be a singleton type of request before sending the request to the identified storage node.

12. The method of claim 5, wherein the identified storage node received the portion of the database from another storage node implemented in a different availability zone.

13. The method of claim 5, wherein the container host is provisioned by a virtual compute service offered by a provider network that also offers the network-based service responsive to a request to provision the container host with local routing received at the virtual compute service.

14. One or more non-transitory, computer-readable storage media, storing program instructions that when executed on or across one or more computing devices cause the one or more computing devices to implement:
receiving, at a routing application, a request to access a portion of a database stored in a network-based service from a client application hosted by a same container engine as the routing application, the network-based service comprising a plurality of storage nodes that store different respective portions of a plurality of databases including the database;
identifying, by the routing application, one of the plurality of storage nodes that stores the portion of the database according to a storage node mapping for the network-based service obtained by the routing application;
including, by the routing application, an identification token obtained by the routing application to provide verifiable authorization to access the portion of the database at the identified storage node when sending the request to the identified storage node; and returning, by the routing application, a result for the request to the client application based, at least in part, on a response received from the identified storage node at the routing application.

15. The one or more non-transitory, computer-readable storage media of claim 14, storing further instructions that when executed on or across the one or more computing devices cause the one or more computing devices to implement:
obtaining the storage node mapping in response to receiving an error response from a different one of the storage nodes that was sent the request.

16. The one or more non-transitory, computer-readable storage media of claim 14, storing further instructions that when executed on or across the one or more computing devices cause the one or more computing devices to implement:
receiving admission information from the network-based service; and
determining that the access request is allowed to be performed based, at least in part, on the admission information before sending the request to the identified storage node.

17. The one or more non-transitory, computer-readable storage media of claim 14, storing further instructions that when executed on or across the one or more computing devices cause the one or more computing devices to implement:
receiving another request to access the database at the routing application;
determining that the other access request exceeds a throttling limitation for the database; and
dropping the other access request.

18. The one or more non-transitory, computer-readable storage media of claim 14, storing further instructions that when executed on or across the one or more computing devices cause the one or more computing devices to implement:
receiving, by the routing, application, another request to access another portion of the database;
identifying, by the routing, application, a type for the other request; and
forwarding, by the routing, application, the other request to a request router for the network-based service to perform the other request according to the type.

19. The one or more non-transitory, computer-readable storage media of claim 18, storing further instructions that when executed on or across the one or more computing devices cause the one or more computing devices to implement formatting the other request using a connection-based protocol before forwarding the other request.

20. The one or more non-transitory, computer-readable storage media of claim 14, wherein the container host is provisioned by a virtual compute service offered by a provider network that also offers the network-based service responsive to a request to provision the container host with local routing received at the virtual compute service.

* * * * *